Oct. 18, 1966 P. W. JENSEN 3,280,348

ELECTRONIC SIGNAL GATING SYSTEM WITH GATES OPERATED IN RESPONSE TO CHANGES IN THE SIGNAL BEING GATED

Filed June 26, 1964 4 Sheets-Sheet 1

INVENTOR.
PETER W. JENSEN

BY James H. Griffin

ATTORNEY

INVENTOR.
PETER W. JENSEN
BY James H. Griffin
ATTORNEY

INVENTOR.
PETER W. JENSEN
BY James H. Griffin
ATTORNEY

INVENTOR.
PETER W. JENSEN
BY James H. Griffin
ATTORNEY

United States Patent Office 3,280,348
Patented Oct. 18, 1966

3,280,348
ELECTRONIC SIGNAL GATING SYSTEM WITH GATES OPERATED IN RESPONSE TO CHANGES IN THE SIGNAL BEING GATED

Peter W. Jensen, Fremont, Calif., assignor to Ampex Corporation, Redwood City, Calif., a corporation of California Filed June 26, 1964, Ser. No. 378,140
7 Claims. (Cl. 307—88.5)

This application relates to gating circuits and more particularly to a transistorized gating circuit which operates in response to changes in the signal being gated and thus does not require a separate gating signal.

Applicant's gating circuit will be described in connection with the magnetic tape recording art, but it is to be understood that the inventive concept is applicable wherever gating of one or more input signals is to be performed.. In the playback mode of operation of a rotary head magnetic tape recorder, each pair of opposed heads is joined, so that the playback signal appears in at least one of two channels at all times. Following pre-amplification and before further amplification or demodulation, these signal pass through a gating network, where they are switched into a single output line by "opening the gate" to one of the two input channels and "closing the gate" to the other. Applicant's invention is concerned mainly with the creation or derivation of the control signals whereby each gate is opened and closed.

In the prior practice of rotary head tape recording, gate control signals were received from a tachometer (photo-electric or electro-magnetic) on the rotating head drum. To avoid quadrature and other problems, a "once-around" signal was derived, which had not only to be quadrupled to provide the four gate control signals needed during each rotation of the head drum, but also to be delayed to the exact time gating was to take place. The oscillator and delay circuits necessary to accomplish these objectives were complex and expensive. Moreover, they could operate at only one input frequency, usually 240±5 c.p.s. If for some reason the head rotation were slowed to 120 c.p.s. or speeded up to 480 c.p.s., the gates would not function unless the oscillator and delay circuits were replaced or at least greatly modified. Also, since a "once-around" signal such as that upon which the prior gate control signals were based cannot reflect phase changes (i.e.—short, fraction-of-a-revolution variations in speed of rotation), gating in such a system would not be perfectly phase-synchronized.

It is, therefore, the general object of this invention to provide an improved gating system.

Another object of this invention is to provide a gating system wherein switch timing is related as closely as possible to the signal being gated.

Another object of this invention is to provide improved accuracy and reliability of gating and independence from drum frequency.

Another object of this invention is to provide a gating system which does not require the creation or derivation of an outside control signal in order to actuate the gate.

Another object of this invention is to provide an improved electronic gating system which is simpler, less expensive, and requires less power than prior gating systems.

In the achievement of the above objects and as a feature of applicant's invention, there is provided a gating system for pairs of RF channels wherein the RF signal itself is used to open its own gate. In broader applications of the inventive principle, some specific component of an input signal may be filtered into a sensing network to provide gate control signals. In the preferred embodiment of this inventive principle, the incoming RF envelopes of each channel are filtered to form pulses of the same duration, the pulses are differentiated, and the differential spikes thereof are used to switch a bistable multivibrator between one state and another. The output of the bistable multivibrator provides the gating pulses which cause the appropriate gate to open during the presence of RF signals and thus normally provides a continuous feed of information to the output terminal of the circuit.

Other objects and features of this invention and a fuller understanding thereof may be had by referring to the following description and claims taken in conjunction with the accompanying drawings, in which:

Figure 1A:
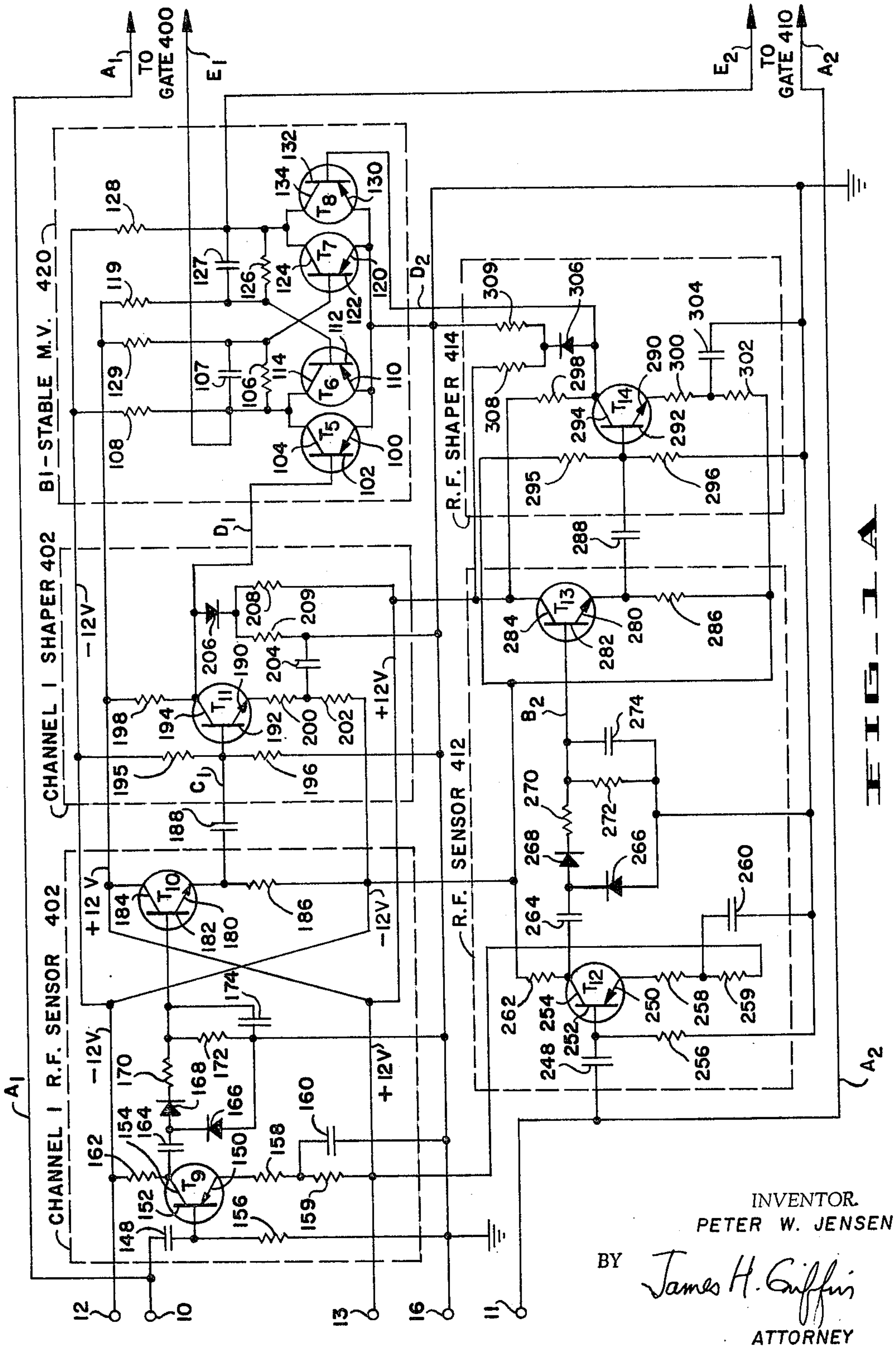
FIGURE 1 is a schematic drawing of the circuit which is a preferred embodiment of applicant's invention, part A showing the gate control electronics of the circuit, part B showing the gates themselves.
Figure 1B:
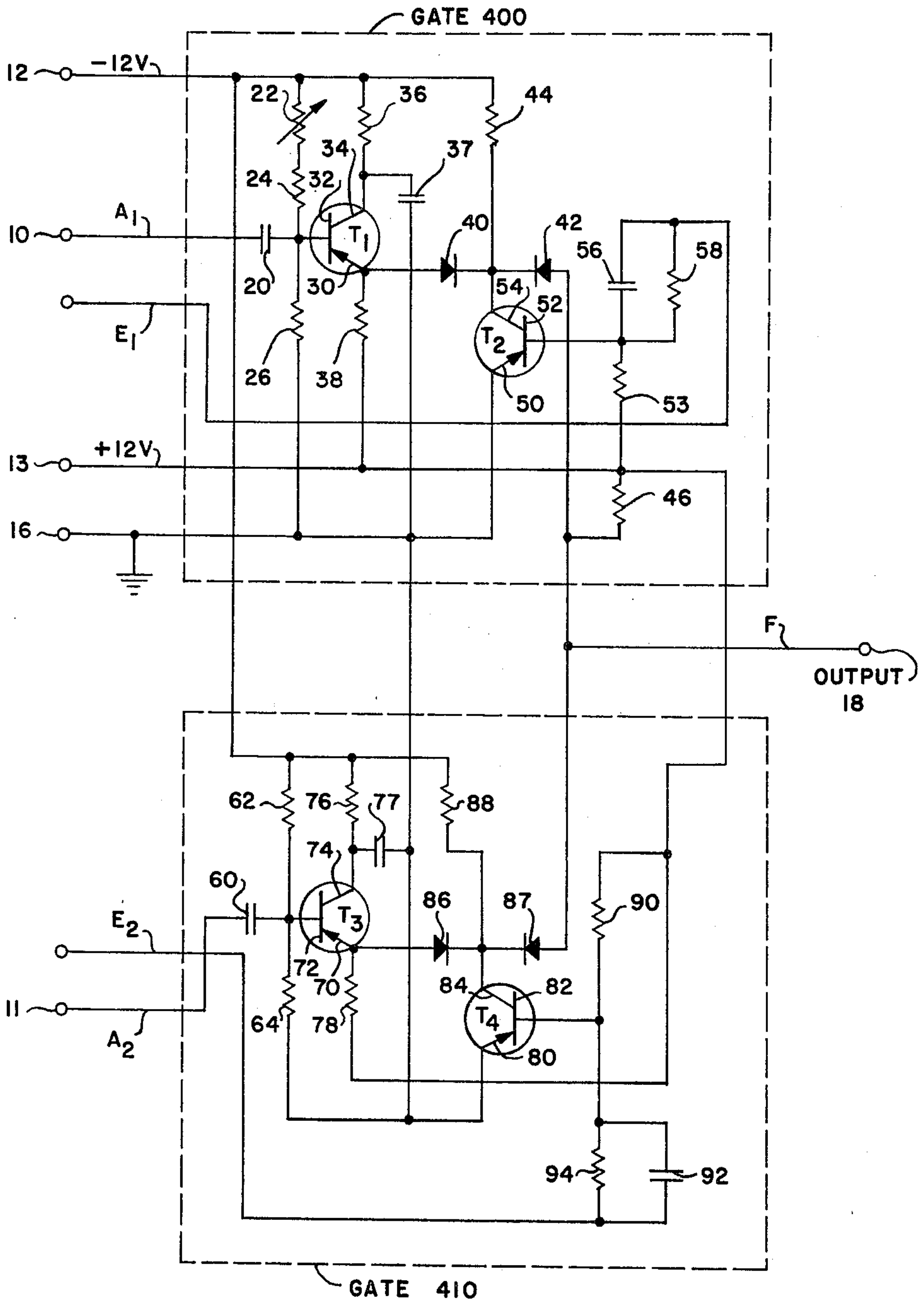

Referring to the FIGURE 1, it may be seen that the circuit which is a preferred embodiment of applicant's invention has input terminals 10 (channel 1) and 11 (channel 2), negative and positive power supply terminals 12 and 13, respectively, a ground terminal 16, and an output terminal 18. For purposes of illustration, the power supplies are specified as −12 volts D.C. at the terminal 12 and +12 volts D.C. at the terminal 13.

A D.C. blocking capacitor 20 is coupled to the input terminal 10. The blocking capacitor 20 is coupled to a D.C. voltage maintenance network composed of a variable resistor 22 and two resistors 24 and 26 coupled in series between the power supply 12 and ground 16. The purpose of the D.C. voltage maintenance network is to ensure a steady and uniform signal level in both channels, thus minimizing transients due to difference in D.C. level upon switching from one channel to another.

An emitter-follower transistor T1 having emitter 30, base 32, and collector 34 receives the signal from the input terminal 10 on its base 32. Its collector 34 is coupled through a resistor 36 to the negative power supply 12 and through a capacitor 37 to ground 16; its emitter 30 is coupled through a resistor 38 to the positive power supply 13.

Following the emitter-follower transistor T1 comes the gate proper of the first channel. This channel one gate is composed of a diode 40, a diode 42, a resistor 44, and a transistor T2 having emitter 50, base 52, and collector 54. The emitter 50 of the transistor T2 is directly coupled to ground 16; the collector 54 is coupled through the resistor 44 to the negative power supply 12. The base 52 of the transistor T2 is coupled through a resistor 53 to the positive power supply 13 and through the parallel combination of a capacitor 56 and a resistor 58 to a source of gating signals to be described hereinafter. The diode 40 is connected between the emitter 30 and the collector 54; the diode 42 of the first gating network is directly coupled from the collector 54 to the output terminal 18 and is coupled through a resistor 46 to the positive power supply 13.

In similar manner, the second channel input terminal 11 is coupled to a D.C. blocking capacitor 60, which in turn is coupled to a D.C. level maintenance network comprising two resistors 62 and 64 coupled between the negative power supply 12 and ground 16. Following the D.C. level maintenance network is an emitter-follower transistor T3 having emitter 70, base 72, and collector 74. The collector 74 is coupled to the negative power supply through a resistor 76 and to ground through a capacitor 77. The emitter 70 is coupled to the positive power supply through a resistor 78. The base 72 of the transistor T3 is coupled to receive the signal from the D.C. level maintenance circuit, and the emitter 70 is coupled to the next stage, the gating circuit proper for channel two.

The channel two gate is composed of a transistor T4 having emitter 80, base 82, and the collector 84 and of two diodes 86 and 87 and a resistor 88. The emitter 80 of the transistor T4 is coupled to ground 16, while the collector 84 is coupled to the negative power supply through the resistor 88, to the emitter 70 of the transistor T3 through the diode 86, and to the output terminal 18 through the diode 87. The base 82 of the transistor T4 is coupled through a resistor 90 to the positive power supply 13 and through the parallel combination of a capacitor 92 and a resistor 94 to a source of gate control signals to be described hereinafter.

The source of gate control signals referred to above is a bistable multivibrator comprising four transistors T5, T6, T7, and T8 having emitters 100, 110, 120, and 130, respectively, bases 102, 112, 122, and 132, respectively, and collectors 104, 114, 124, and 134, respectively. The emitters 100 and 110 of the transistors T5 and T6 are joined together and coupled to ground 16; the emitters 120 and 130 of the transistors T7 and T8 are likewise joined together and coupled to ground 16. The collectors 104 and 114 of the transistors T5 and T6 are joined together and coupled through the parallel combination of a resistor 106 and a capacitor 107 to the base 122 of the transistor T7. The collectors 124 and 134 of the transistors T7 and T8 are joined together and coupled through the parallel combination of a resistor 126 and a capacitor 127 to the base 112 of the transistor T6. The joined collectors 104 and 114 are also coupled through a resistor 108 to the negative power supply 12; the joined collectors 124 and 134 of the transistors T7 and T8 are coupled through a resistor 128 to the negative power supply 12. The base 112 of the transistor T6 is coupled through a resistor 119 to the positive power supply 13; the base 122 of the transistor T7 is coupled through a resistor 129 to the positive power supply 13.

The inputs to the multivibrator circuit described above are pulses as shown in FIGURE 3(D1) and (D2) appearing on the bases 102 and 132 of the transistors T5 and T8 from circuits to be described below. The output of the multivibrator circuit, appearing both on the joined collectors 104 and 114 of the transistors T5 and T6 and on the joined collectors 124 and 134 of the transistors T7 and T8 (waveforms E1 and E2 of FIGURE 3), is coupled to the bases 52 and 82 of the transistors T2 and T4 of the two gating networks.

The inputs to the multivibrator circuit described above, the waveform D1 and D2 applied to the bases 102 and 132, respectively, of the transistors T5 and T8, are derived from the input waveforms A1 and A2 (of FIGURE 3), respectively, by two distinct but identical networks now to be described. The first such network begins with a capacitor 148 coupled to the input terminal 10. A transistor T9 having emitter 150, base 152, and collector 154, has its base 152 coupled to the blocking capacitor 148 and coupled through a resistor 156 to ground. The emitter 150 of the transistor T9 is coupled through two resistors 158 and 159 to the positive power supply 13. A decoupling capacitor 160 is connected between the two resistors 158 and 159. The collector 154 of the transistor T9 is coupled to the negative power supply 12 through a resistor 162. Since the output from the transistor T9 is taken from the collector 154, this transistor provides amplification and a substantially constant current source for the circuitry to follow.

The output from the collector 154 of the transistor T9 is coupled through a coupling capacitor 164 which has its output held above ground by a diode 166 coupled to ground 16 and a diode 168 which blocks negative output currents. The RF envelope from the capacitor 164 (waveform A1 at an elevated level) is converted into a pulse of substantially the same duration by an RC smoothing filter comprising two resistors 170, 172, and a capacitor 174 coupled in parallel with the resistor 172 to ground 16.

The transistor T10 having emitter 180, base 182, and collector 184 is coupled in emitter-follower configuration. The base 182 of the transistor T10 receives the output of the smoothing filter (waveform B1 of FIGURE 3). The emitter 180 of the transistor T10 is coupled through a resistor 186 to the negative power supply while the collector 184 is directly coupled to the positive power supply 13. The emitter-follower transistor T10 drives the smoothed signal from the filter into a differentiating capacitor 188, across which there appear positive and negative going spikes in response to the beginning and termination of each positive-going portion of the channel one RF envelope (see FIGURE 3, waveform C1).

The transistor T11 having emitter 190, base 192, and collector 194 has its base 192 coupled to receive the waveforms C1 from the capacitor 188. A resistor 195 coupled between the base 192 and the negative power supply 12 and another resistor 196 coupled between the base 192 and ground 16 maintain a constant D.C. operating level for the transistor T11. The collector 194 of the transistor T11 is coupled to the positive power supply through a resistor 198. The emitter 190 of the transistor T11 is coupled through two resistors 200 and 202 to the negative power supply 12. A decoupling capacitor 204 is connected between the resistor 200 and the resistor 202. The transistor T11 being of the N-P-N conductivity-type, the positive-going portions of waveform C1 will render it conductive while the negative-going portions will cut it off. Since the transistor T11 is coupled in essentially grounded-emitter configuration, the positive-going portions of the waveform B1 which cause it to conduct are reproduced with a phase inversion on the collector 194—i.e., as negative-going pulses. A network comprising a diode 206, a resistor 208, and a resistor 209 protects the junctions of the transistor T5 from the high voltages which might otherwise appear on the collector 194 when the transistor T11 is cut off. The resistors 208 and 209 are connected in series between the positive power supply 13 and ground 16, thus acting as a voltage divider for the diode 206, which has its cathode coupled between the two resistors 208 and 209. The anode of the diode 206 is coupled to the collector 194. When the transistor T11 is cut off and its collector-voltage tends to rise toward that of the positive power supply 13, the diode 206 will begin to conduct when the voltage on the collector 194 exceeds the voltage maintained between the resistor 208 and the resistor 209. The signal at 194, waveform D1, is applied to the base 102 of the transistor T5 in the multivibrator network.

The waveform D2 is derived from the input waveform by a network which begins with a D.C. blocking capacitor 248 coupled to the input terminal 11. A transistor T12 having emitter 250, base 252, and collector 254, has its base 252 coupled to the blocking capacitor 248 and coupled through a resistor 256 to ground. The emitter 250 of the transistor T12 is coupled through two resistors 258 and 259 to the positive power supply 13. A decoupling capacitor 260 is connected between the two resistors 258 and 259. The collector 254 of the transistor T12 is coupled to the negative power supply 12 through a resistor 262. Since the output from the transistor T12 is taken from the collector 254, this transistor provides amplification and a substantially constant current source for the circuitry to follow.

The output from the collector 254 of the transistor T12 is coupled through a capacitor 264 to a smoothing network wherein positive-going portions of the RF envelope (waveform A2 elevated to a positive center amplitude by two diodes 266 and 268) is converted into pulses of substantially the same duration (waveform B2) by an RC smoothing filter comprising two resistors 270 and 272 and a capacitor 274 coupled in parallel with the resistor 272 to ground 16.

The transistor T13 having emitter 280, base 282, and collector 284 is coupled in emitter-follower configuration. The base 282 of the transistor T13 receives the output of the smoothing filter. The emitter 280 of the transistor T13 is coupled through a resistor 286 to the negative power supply 12 while the collector 284 is directly coupled to the positive power supply 13. The emitter-follower transistor T13 drives the smoothed signal from the filter into a capacitor 288 which produces positive and negative going spikes in response to the beginning and termination of each RF envelope (see FIGURE 3, waveform C2).

Figure 3:
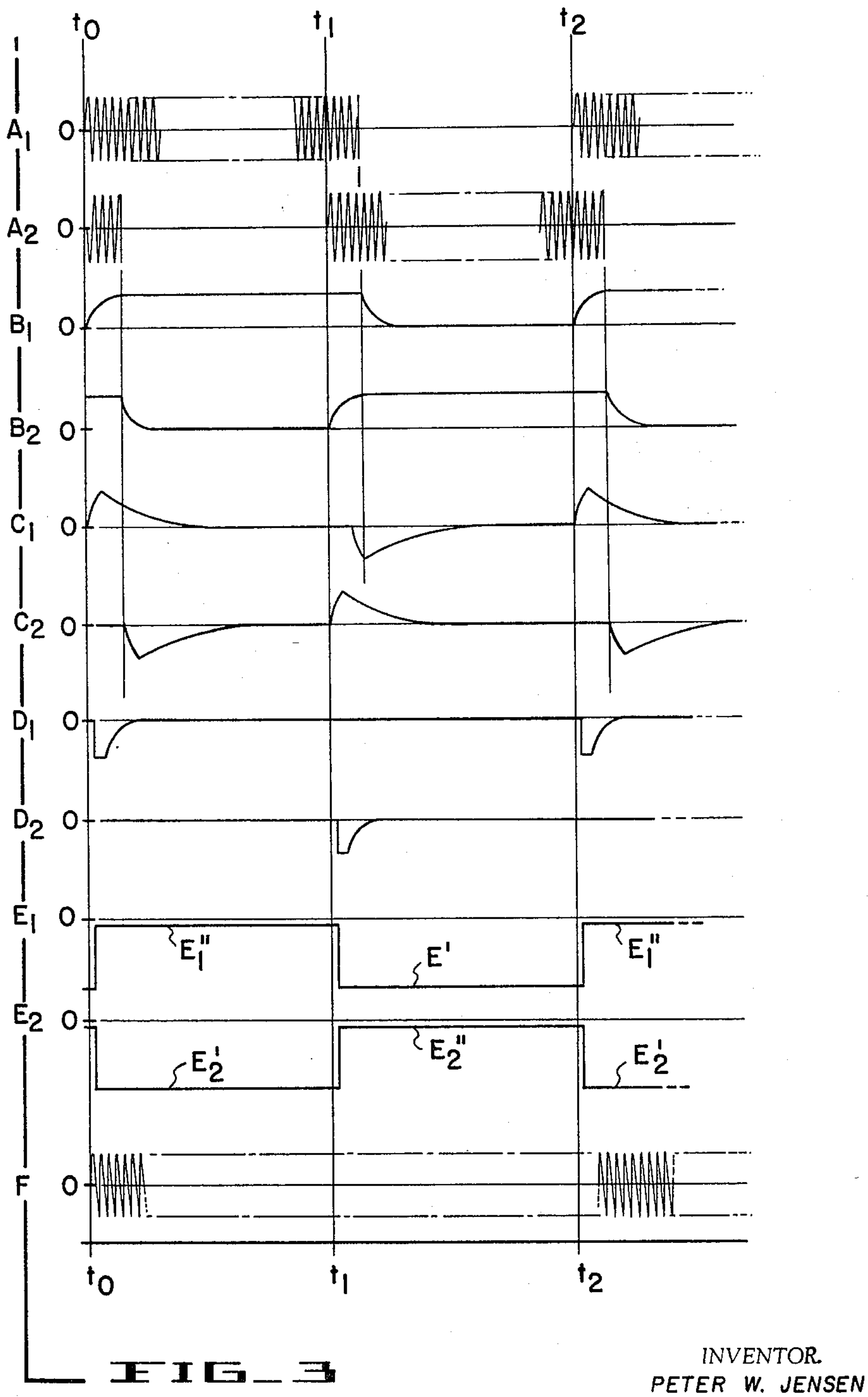
FIGURE 3 illustrates the waveforms appearing at certain selected points in the circuit of FIGURE 1.

The transistor T14 having emitter 290, base 292, and collector 294 has its base 292 coupled to receive the spikes C2 from the capacitor 288. A resistor 295 coupled between the base 292 and the negative power supply 12 and another resistor 296 coupled between the base 292 and ground 16 cooperate to maintain a constant D.C. operating level for the transistor T14. The collector 294 of the transistor T14 is coupled to the positive power supply 13 through a resistor 298. The emitter 290 of the transistor T14 is coupled through two resistors 300 and 302 to the negative power supply 12. A decoupling capacitor 304 is connected between the resistor 300 and the resistor 302. The transistor T14 being of the N-P-N conductivity-type, the positive-going portions of waveform B2 will render it conductive, while the negative-going portions will cut it off. Since the transistor T14 is coupled in essentially grounded-emitter configuration, the positive-going portions of the waveform C2 which cause it to conduct are reproduced with a phase inversion on the collector 294—i.e., as negative-going pulses (FIGURE 3, D2). A network comprising a diode 306, a resistor 308, and a resistor 309 protects the junctions of the transistor T8 from the high voltages which might otherwise appear on the collector 294 when the transistor T14 is cut off. The resistors 308 and 309 are connected in series between the positive power supply 13 and ground 16, thus acting as a voltage divider for the diode 306, which has its cathode coupled between the two resistors 308, 309. The anode of the diode 306 is coupled to the collector 294. Accordingly, when the transistor T14 is cut off and its collector-voltage tends to rise toward that of the positive power supply 13, the diode 306 will begin to conduct when the voltage on the collector 294 exceeds the voltage maintained between the resistor 308 and the resistor 309. Waveform D2 is applied to the base 132 of the transistor T8 in the multivibrator network.

Figure 2:
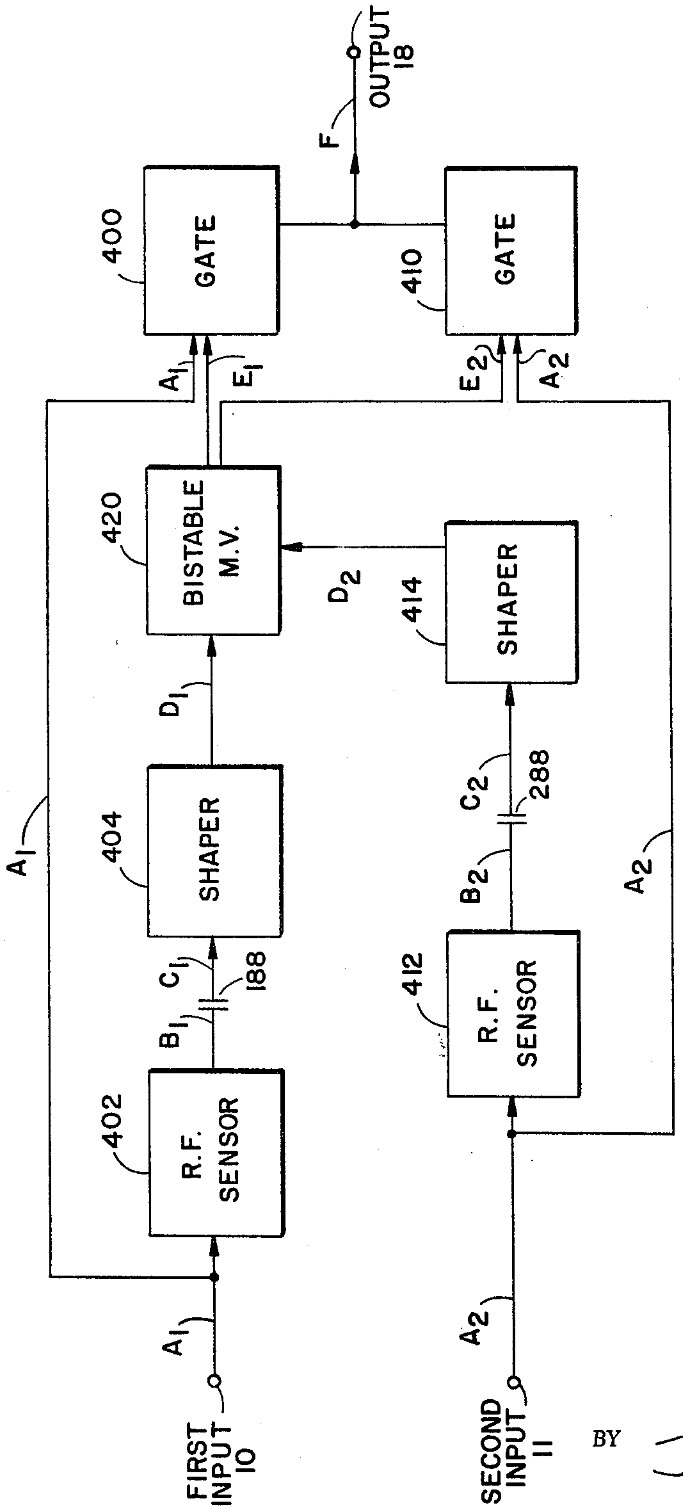
FIGURE 2 is a block diagram of the circuit shown schematically in FIGURE 1.

Referring to FIGURE 2, it can be seen that the circuitry of FIGURE 1 can be summarized into the following: two terminals 10 and 11 to receive the input waveforms of channel 1 and channel 2 (FIGURE 3, A1 and A2), respectively; two gates 400 and 410, which alternately pass waveforms A1 and A2 through to the output terminal 18 to form summation waveform F; a bistable multivibrator 420 which produces the gate control signals $E_1$ and $E_2$; and a network for each channel which senses the arrival of each new burst of input signal in that channel and applies a control signal to the bistable multivibrator 420 in response thereto. The sensing networks consist of RF sensing circuits 402, 412, which produce the waveforms B1 and B2, the capacitors 188 and 288 which derive the spikeforms C1 and C2 in response to the leading and trailing edges of the waveforms B1 and B2, respectively, and shaping circuits 404 and 414 which convert the spikes C1 and C2 into usable form for switching the bistable multivibrator 420 (the waveforms of FIGURE 3, D1 and D2).

The operation of the gates 400 and 410 (components 20 through 94 of FIGURE 1) is as follows: waveforms A1 and A2 appearing on the input terminals 10 and 11 are coupled to the bases 32 and 72 of the emitter-follower transistors T1 and T3. The D.C. operating levels of emitter-followers T1 and T3 are held very close together by the voltage division networks comprising the resistors 22, 24, and 26 (for the transistor T1) and the resistors 62 and 64 for the (transistor T3) between the negative power supply 12 and ground 16. This uniformity of operating level is necessary so that a minimal switching transient will arise when the output terminal 18 is switched from the first channel to the second channel. The variable resistor 22 permits fine adjustment of relative D.C. levels to eliminate such switching transients.

The emitter-followers T1 and T3 drive their respective RF input signals (A1 and A2) with low input impedance yet with very high output impedance into the basic gating networks, comprising the diodes 40 and 42, the transistor T2 and the resistor 44 for the first channel and the diodes 86 and 87, the transistor T4 and the resistor 88 for the second channel. The combined effect of the gate control signals E1 and E2 from the multivibrator 420, is to keep one of the transistors T2 or T4 "on" (i.e.—conductive) and the other "off" at all times. The emitters 50 and 80 of the transistors T2 and T4 being directly coupled to ground, the junctions of their respective collectors with the gating diodes will be essentially grounded during the "on" or conductive state, so that signals from the emitter-followers T1 or T3 will not then be able to reach the output terminal 18.

Whenever one of the gating transistors is off, current will flow from the positive power supply 13 through either the resistors 38 and 44 (when T2 is off) or the resistors 78 and 88 (when T4 is off) to the negative power supply 12. Since the gating diodes associated with the "off" transistor will thus be rendered conductive, signals from the corresponding emitter-follower will pass therethrough to the output terminal 18, a situation corresponding to "open" gate.

Transistors T2 and T4 both being of the P-N-P conductivity type, signals E1 and E2 cause the appearance on their bases 52 and 82 of signals which produce an "on" state (closed gate) when they are negative (corresponding to E1′ and E2′) and produce the "off" state (open gate) when they are positive (corresponding to E1″ and E2″). The signal E1′ occurs when the transistors T5 and T6 are cut off, for then the voltage on the joined collectors 104 and 114 is determined by the voltage division effect of the resistors 53, 58 and 108 coupled between the positive power supply 13 and the negative power supply 12. If the resistor 53 is selected to be many times the magnitude of the combined value of the resistors 58 and 108, the voltage of the signal E1 will approach that of the negative power supply 12. If the value of the resistor 58 is not very high, this will result in a similarly low voltage on the base 52 of the transistor T2, rendering the transistor T2 conductive and the channel one gate "closed." If, on the other hand, the transistors T5 and T6 are in the conductive state, their joined collectors 104 and 114 will have a voltage very close to that of their grounded joined emitters 100 and 110. Thus the signal E1 will be very close to ground, and if the resistor 58 is selected relatively small as compared with the resistor 53, the voltage on the base 52 will be just a little above that of ground 16. Since the emitter 50 of the transistor T2 is directly coupled to ground 16, even such a small positive voltage on the base 52 will render the transistor T2 nonconductive and the first channel gate "open."

Likewise, since the transistor T4 is of the P-N-P conductivity type, the signal E2 which is applied to its base 82 will cause an "on" state (closed gate) when negative (E2') and an "off" state (open gate) when near zero (E2"). The signal E2' occurs when the transistor T7 is cut off, for then the voltage on the joined collectors 124 and 134 is determined by the voltage division effect of the resistors 90, 94, and 128 coupled between the positive power supply 13 and the negative power supply 12. If the resistor 90 is of many times the magnitude of the combined value of the resistors 94 and 128, the voltage of the signal E2 will approach that of the negative power supply 12. If the value of the resistor 94 is not very high, this will result in a similarly low voltage on the base 82 of the transistor T4, rendering the transistor T4 conductive and the channel two gate "closed." if, on the other hand, the trasistor T7 is in the conductive state, the joined collectors 124 and 134 will have a voltage very close to that of the grounded joined emitter 120. Thus the signal E2 will be very close to ground, and if the resistor 94 is selected relatively small as compared with the resistor 90, the voltage on the base 82 will be just a little above that of ground 16. Since the emitter 80 of the transistor T4 is directly coupled to ground 16, even this small positive voltage will render the transistor T4 nonconductive and the second channel gate "open."

The transistor T6 is initially switched into its conductive state by the arrival of a negative-going pulse D1 on the base 102 of the transistor T5, causing the joined collectors 104 and 114 to assume a voltage very near that of ground 16. Thereupon voltage division will occur between the positive power supply 13 and ground 16 through the resistors 129 and 106. The base 122 of the transistor T7, being coupled between the resistor 106 and the resistor 129, will have a positive voltage impressed upon it, so that the transistor T7 will be cut off and held nonconductive as long as the transistor T6 continues to conduct. While the transistor T7 is being held nonconductive, the joined collectors 124 and 134 will be at the negative voltage shown in FIGURE 3, waveform E2'. The voltage division between this voltage E2' and the positive power supply 13, through the resistors 126 and 119, will result in a negative voltage being applied to the base 112 of the transistor T6, if the resistor 119 is selected sufficiently larger than the resistor 126. Thus, the transistor pair T6 will be in the conductive state as long as the transistor pair T7 is held nonconductive, until a pulse D2 arrives at the base 132 of the transistor T8, after having been derived from the input RF waveform A2 as described heretofore.

The transistor T7 is initially switched into the conductive state by the arrival of a negative-going pulse D2 on the base 132 of the transistor T8, causing the joined collectors 124 and 134 to assume a voltage very near that of ground 16. Thereupon voltage division will occur between the positive power supply 13 and ground 16 through the resistors 119 and 126. The base 112 of the transistor T6, being coupled between the resistor 126 and the resistor 119, will have a positive voltage applied to it, and the transistor T6 will be cut off and held nonconductive, causing the appearance of the waveform E1" on the joined collectors 104, 114. The voltage division between this low voltage E1" and the positive power supply 13 through the resistors 106 and 129 will result in a negative voltage being applied to the base 122 of the transistor T7, if the resistor 129 is selected sufficiently larger than the resistor 106. Thus, the transistor T7 will be held in its conductive state as long as the transistor T6 is held nonconductive, until a pulse D1 arrives at the base 102 of the transistor T5, after having been derived from the input RF waveform A1 as described heretofore.

A gating circuit in accordance with the above description and drawing was built and operated using the following components:

*Voltages*

12—−12 v. D.C.
13—+12 v. D.C.

*Transistors*

| | |
|---|---|
| T1—2N2048 | T8—2N2048 |
| T2—2N2048 | T9—2N2048 |
| T3—2N2048 | T10—2N2222 |
| T4—2N2048 | T11—2N1304 |
| T5—2N2048 | T12—2N2048 |
| T6—2N2048 | T13—2N2222 |
| T7—2N2048 | T14—2N1304 |

*Diodes*

| | |
|---|---|
| 40—FD189 | 168—FD189 |
| 42—FD189 | 206—1N276 |
| 86—FD189 | 266—FD189 |
| 87—FD189 | 268—FD189 |
| 166—FD189 | 306—1N276 |

*Resistors (Ohms)*

| | |
|---|---|
| 22—10K | 162—1K |
| 24—15K | 170—470 |
| 26—1K | 172—15K |
| 36—2K | 186—5.6K |
| 38—3K | 195—5.6K |
| 44—4.7K | 196—5.6K |
| 46—10K | 198—2K |
| 53—47K | 200—100 |
| 58—4.7K | 202—1.0K |
| 62—20K | 208—1K |
| 64—1K | 209—200 |
| 76—2K | 256—2K |
| 78—3K | 258—47 |
| 88—4.7K | 259—2.2K |
| 90—47K | 262—1K |
| 94—4.7K | 270—470 |
| 106—10K | 272—15K |
| 108—1K | 286—5.6K |
| 119—47K | 295—5.6K |
| 126—10K | 296—5.6K |
| 128—1K | 298—2K |
| 129—47K | 300—100 |
| 156—2K | 302—1.0K |
| 158—47 | 308—1K |
| 159—2.2K | 309—200 |

*Capacitors (Microfarads)*

| | |
|---|---|
| 20—.01 | 164—1.0 |
| 37—0.1 | 174—$5\times10^{-3}$ |
| 56—$47\times10^{-6}$ | 188—0.1 |
| 60—.01 | 204—100 |
| 77—0.1 | 248—$1\times10^{-3}$ |
| 92—$47\times10^{-6}$ | 260—0.1 |
| 107—$47\times10^{-6}$ | 264—1.0 |
| 127—$47\times10^{-6}$ | 274—$5\times10^{-3}$ |
| 148—$1\times10^{-3}$ | 288—0.1 |
| 160—0.1 | 304—100 |

The above specified circuit was operated with 200 millivolt RF inputs at the terminals 10 and 11; the length of each burst of RF was approximately 1 millisecond. The transistors T9 and T12 in the sensing networks had gains exclusive of loading from the smoothing filters of about 20. The upper limitations on the waveforms D1 and D2, maintained by the voltage division of the resistors 208, 209, and 308, 309, respectively, was two volts; the lower limit, at which the corresponding multivibrator transistor T5 or T8 turned on, was about −0.3 volt. The voltage levels E1' and E2' were about −9.2 volts; the voltage levels E1" and E2" were about −0.2 volt.

Thus, applicant has provided an improved gating system wherein switch timing is related as closely as possible to the signal being gated, thus ensuring improved accuracy and reliability of gating and independence from drum frequency or any other external gate control signal source. A comparison of the gating system shown schematically in FIGURE 1 with prior gating circuits will show that it is composed of about half the components formally required and, thus, is simpler, less expensive, and less consumptive of power.

A number of alternative arrangements will readily suggest themselves to those skilled in the art. For example, N-P-N conductivity-type transistors and P-N-P conductivity-type transistors may be interchanged, if only the power supply, biasing elements, and other circuit components are appropriately reversed. However, although the invention has been described with a certain degree of particularity, it is to be understood that the present disclosure has been made only by way of example and that numerous changes in the details of construction and the combination and arrangement of parts may be resorted to without departing from the spirit and the scope of the invention as hereinafter claimed.

What is claimed is:

1. A gating system for selectively coupling RF input signals from a plurality of input channels to an output terminal, comprising: a plurality of gates, one coupled between the end of each input channel and the output terminal and means for producing control signals for the gates in response to the presence of said input signals in the respective input channels, said control signal producing means including an RF smoothing filter coupled to each input channel to form unidirectional pulses having durations substantially equal to those of said RF input signals responsive to the presence thereof in the corresponding channel, differentiating means coupled to each RF smoothing filter for generating trigger pulses in time correspondence with and responsive to a predetermined one of the edges of said unidirectional pulses, and a bistable multivibrator operatively coupled to switch in response to the trigger pulses of the respective differentiating means and generate first and second oppositely phased outputs initiated in response to the trigger pulses of one differentiating means and terminated in response to the trigger pulses of the other differentiating means, said multivibrator outputs respectively coupled in gating relation to said gates.

2. A gating system for selectively coupling RF input signals from a plurality of input channels to an output terminal, comprising: a plurality of gates, one coupled between the end of each input channel and the output terminal, each of said gates having two unidirectional conductive devices connected in series opposition and a gate control transistor coupled between the unidirectional conductive devices, and means for producing control signals for the gates in response to the presence of said input signals in the respective input channels, said control signal producing means including an RF smoothing filter coupled to each input channel to form unidirectional pulses having durations substantially equal to those of said RF input signals responsive to the presence thereof in the corresponding channel, differentiating means coupled to each RF smoothing filter, and a bistable multivibrator coupled to receive the trigger pulses of the respective differentiating means and generate first and second oppositely phased outputs initiated in response to the trigger pulses of one differentiating means and terminated in response to the trigger pulses of the other differentiating means, said multivibrator outputs respectively coupled to the gate control transistors of said gates.

3. A gating system for selectively coupling signals from a plurality of input terminals to an output terminal, comprising: a first transistor having emitter, base, and collector, the base of the first transistor being coupled to D.C. operating level maintenance means and to the first input channel, means coupled to the emitter and collector of said first transistor to bias same to be normally conducting, a second transistor having emitter, base, and collector, the collector of the second transistor being coupled through a first diode to the emitter of the first transistor and through a second diode to the output terminal, means connected to the emitter and collector of said second transistor to bias same for conduction and non-conduction respectively in response to first and second signal levels at the base thereof, a third transistor having emitter, base, and collectors, the base of the third transistor being coupled to D.C. operating level maintenance means and to the second input channel, means coupled to the emitter and collector of said third transistor to bias same to be normally conducting, a fourth transistor having emitter, base, and collector, the collector of the fourth transistor being coupled through a third diode to the emitter of the third transistor and through a fourth diode to the output terminal, means coupled to the emitter and collector of said fourth transistor to bias same for conduction and non-conduction respectively in response to first and second signal levels at the base thereof, a bistable multivibrator with respective output terminals coupled to the bases of the second and fourth transistors to supply oppositely phased signals thereto varying between said first and second signal levels in response to trigger signals at first and second input terminals thereof, a fifth transistor having emitter, base, and collector, the base of the fifth transistor being coupled to the first input channel, means coupled to the emitter and collector of said fifth transistor to bias same to be normally conducting, a first smoothing filter coupled to the collector of the fifth transistor, a sixth transistor having emitter, base, and collector, the base of the sixth transistor being coupled to the first smoothing filter, means coupled to the emitter and collector of said sixth transistor to bias same to be normally conducting, and a seventh transistor having emitter, base, and collector, the base of the seventh transistor being coupled through a first differentiating capacitor to the emitter of the sixth transistor, the collector of the seventh transistor being coupled to the first input terminal of the multivibrator, means connected to the emitter and collector of the seventh transistor to bias same to be conducting in response to signals of one polarity and non-conducting in response to signals of the opposite polarity, an eighth transistor having emitter, base, and collector, the collector of the eighth transistor being coupled to a second smoothing filter, means connected to the emitter and collector of said eighth transistor to bias same to be normally conducting, a ninth transistor having emitter, base, and collector, the base of the ninth transistor being coupled to the second smoothing filter, means connected to the emitter and collector of the ninth transistor to bias same to be conducting in response to signals of one polarity and non-conducting in response to signals to the opposite polarity, a tenth transistor having emitter, base, and collector, the base of the tenth transistor being coupled through a second capacitor to the emitter of the ninth transistor, the collector of the tenth transistor being coupled to the second input terminal of the multivibrator, and means connected to the emitter and collector of the tenth transistor to bias same to be conducting in response to signal of one polarity and non-conducting in response to signals of the opposite polarity.

4. A gating system for selectively coupling signals from a plurality of input terminals to an output terminal, comprising for each input channel: a first transistor having emitter, base, and collector, the base of the first transistor being coupled to D.C. operating level maintenance means and through a first capacitor to the input terminal for the channel, means connected to the emitter and collector of said first transistor to bias same to be normally conductive, a second transistor having emitter, base and collector, the collector of the second transistor being coupled through a first diode to the emitter of the first transistor and through a second diode to the output terminal, means connected to the emitter and collector of the second transistor to bias same for conduction and non-conduction respectively in response to first and second signal levels at the base thereof, a third transistor having emitter, base, and collector, the base of the third transistor being coupled through a second capacitor to the input terminal for the channel, third and fourth diodes coupled through a third capacitor to the collector of the third transistor, the third diode being grounded, means connected to the emitter and collector of said third transistor to bias same to be nomally conductive, a first smoothing filter coupled to the fourth diode, a fourth transistor having emitter, base, and collector, the base of the fourth transistor being coupled to the first smoothing filter, means connected to the emitter and collector of the fourth transistor to bias same to be normally conductive, a fifth transistor having emitter, base, and collector, the base of the fifth transistor being coupled through a sixth capacitor to the emitter of the fourth transistor, means connected to the emitter and collector of the fifth transistor to bias same to be conducting in response to signals of one polarity and non-conducting in response to signals of the opposite polarity, a fifth diode having a first electrode coupled to the collector of the fifth transistor and having a second electrode coupled to the junction between first and second series resistors, said first resistor connected to ground, bias means connected to said second resistor, and a bistable multivibrator having one input terminal coupled directly to the first electrode of said fifth diode and one output terminal coupled to the base of said second transistor to supply a signal varying between said first and second signal levels.

5. A gating system for selectively coupling signals from a plurality of input terminals to an output terminal, comprising for each input channel: a first transistor having emitter, base, and collector, the base of the first transistor being coupled to D.C. operating level maintenance means and to the input terminal for the channel, means connected to the emitter and collector of said first transistor to bias same to be normally conductive, a second transistor having emitter, base, and collector, the collector of the second transistor being coupled through a first diode to the emitter of the first transistor and through a second diode to the output terminal, means connected to the emitter and collector of the second transistor to bias same for conduction and non-conduction respectively in response to first and second signal levels at the base thereof, a third transistor having emitter, base, and collector, the base of the third transistor being coupled through a capacitor to the input terminal for the channel, means connected to the emitter and collector of the third transistor to bias same to be normally conductive, a first smoothing filter coupled to the collector of the third transistor, a fourth transistor having emitter, base, and collector, the base of the fourth transistor being coupled to the first smoothing filter, means connected to the emitter and collector of the fourth transistor to bias same to be normally conductive, a fifth transistor having emitter, base, and collector, the base of the fifth transistor being coupled through a differentiating capacitor to the emitter of the fourth transistor, means connected to the emitter and collector of said fifth transistor to bias same to be conducting in response to signals of one polarity and non-conducting in response to signals of the opposite polarity, a bistable multivibrator having one input terminal coupled directly to the collector of the fifth transistor and having one output terminal coupled to the base of the second transistor to apply a signal thereto varying between said first and second signal levels.

6. A gating system for selectively coupling RF signals in a plurality of input channels with the signals in the respective channels being sequential with short term overlap at the end of a signal in one channel and the beginning of a signal in the next channel to a common output terminal to form a continuous output signal, comprising a plurality of gates, one being coupled between each input channel and the output terminal, and means coupled between said channels and said gates for producing gate control signals in response to the presence of said RF signals in the respective channels to couple said RF signals from the respective channels to said output terminal in sequence.

7. A gating system for selectively coupling RF signals in first and second input channels to a common output terminal, said signals in said first and second channels occurring sequentially with short term overlap at the end of a signal in one channel and beginning of a signal in the other channel, said system comprising first and second gates respectively coupled between said first and second input channels and said output terminal, a bistable multivibrator having first and second oppositely phased outputs coupled in controlling relation to said gates, said outputs varying between gate openings and closing levels in response to triggering of said multivibrator, and means coupled between said first and second channels and said multivibrator for triggering same in response to the presence of said RF signals in said first and second channels.

References Cited by the Examiner

UNITED STATES PATENTS

| | | | |
|---|---|---|---|
| 2,872,594 | 2/1959 | Logue | 307—88.5 |
| 2,898,455 | 8/1959 | Hymas et al. | 325—304 |
| 2,952,811 | 9/1960 | Carr | 328—127 X |
| 2,968,718 | 1/1961 | McKesson | 328—165 |
| 2,987,577 | 6/1961 | Faulkner. | |
| 3,147,388 | 9/1964 | Clark | 307—88.5 |
| 3,166,678 | 1/1965 | Fleshman et al. | 307—88.5 |
| 3,191,067 | 6/1965 | Zimmerman | 307—88.5 |
| 3,196,359 | 7/1965 | Giger. | |

ARTHUR GAUSS, *Primary Examiner.*

I. C. EDELL, R. H. EPSTEIN, *Assistant Examiners.*